United States Patent [19]
Uesugi et al.

[11] Patent Number: 5,459,683
[45] Date of Patent: Oct. 17, 1995

[54] APPARATUS FOR CALCULATING THE SQUARE ROOT OF THE SUM OF TWO SQUARES

[75] Inventors: Mitsuru Uesugi; Kouichi Honma, both of Yokohama, Japan

[73] Assignee: Matsushita Electric Industrial Co., Ltd., Osaka, Japan

[21] Appl. No.: 277,826

[22] Filed: Jul. 20, 1994

[30] Foreign Application Priority Data

Aug. 2, 1993 [JP] Japan .................................. 5-191099

[51] Int. Cl.$^6$ .................................................. G06F 7/38
[52] U.S. Cl. ........................................................ 364/752
[58] Field of Search ............................................ 364/752

[56] References Cited

U.S. PATENT DOCUMENTS

| | | | |
|---|---|---|---|
| 3,829,671 | 8/1974 | Gathright et al. | 364/752 |
| 3,829,672 | 8/1974 | Sather | 364/752 |
| 3,858,036 | 12/1974 | Lunsford | 364/752 |
| 4,503,549 | 3/1985 | Slabinski | 364/752 |
| 4,553,260 | 11/1985 | Belt et al. | 364/752 |
| 4,599,701 | 7/1986 | Vojir et al. | 364/752 |
| 4,694,417 | 9/1987 | Cantwell | 364/752 |
| 4,736,334 | 4/1988 | Mehrgardt | 364/752 |
| 4,747,067 | 5/1988 | Jagodnik, Jr. et al. | 364/752 |
| 5,159,567 | 10/1992 | Gobert | 364/757 |

FOREIGN PATENT DOCUMENTS

| | | |
|---|---|---|
| 0238300 | 9/1987 | European Pat. Off. . |
| 0437876 | 7/1991 | European Pat. Off. . |
| 2146200 | 4/1985 | United Kingdom . |

OTHER PUBLICATIONS

Electronics Letters, vol. 10, No. 13, 27 Jun. 1974, Engage GB, pp. 255–256, Braun et al. 'Digital hardware for approximating to the amplitude of quadrature pairs'.

Electronics, vol. 56, No. 17, 25 Aug. 1983, New York US, pp. 138–139, Ho et al. 'Comparator compares 2's complement numbers'.

*Primary Examiner*—Tan V. Mai
*Attorney, Agent, or Firm*—Lowe, Price, LeBlanc & Becker

[57] ABSTRACT

A first digital signal of a serial form is processed into a second digital signal of a serial form. The second digital signal represents an absolute value of a value represented by the first digital signal. A third digital signal of a serial form is processed into a fourth digital signal of a serial form. The fourth digital signal represents an absolute value of a value represented by the third digital signal. The values represented by the first and third digital signals are compared to generate a comparison-result digital signal representing a result of the comparison. A calculation-result digital signal of a serial form is generated in response to the second digital signal, the fourth digital signal, and the comparison-result digital signal. The calculation-result digital signal represents a value which is approximate to a square root of a sum of a square of the value represented by the first digital signal and a square of the value represented by the third digital signal.

4 Claims, 9 Drawing Sheets

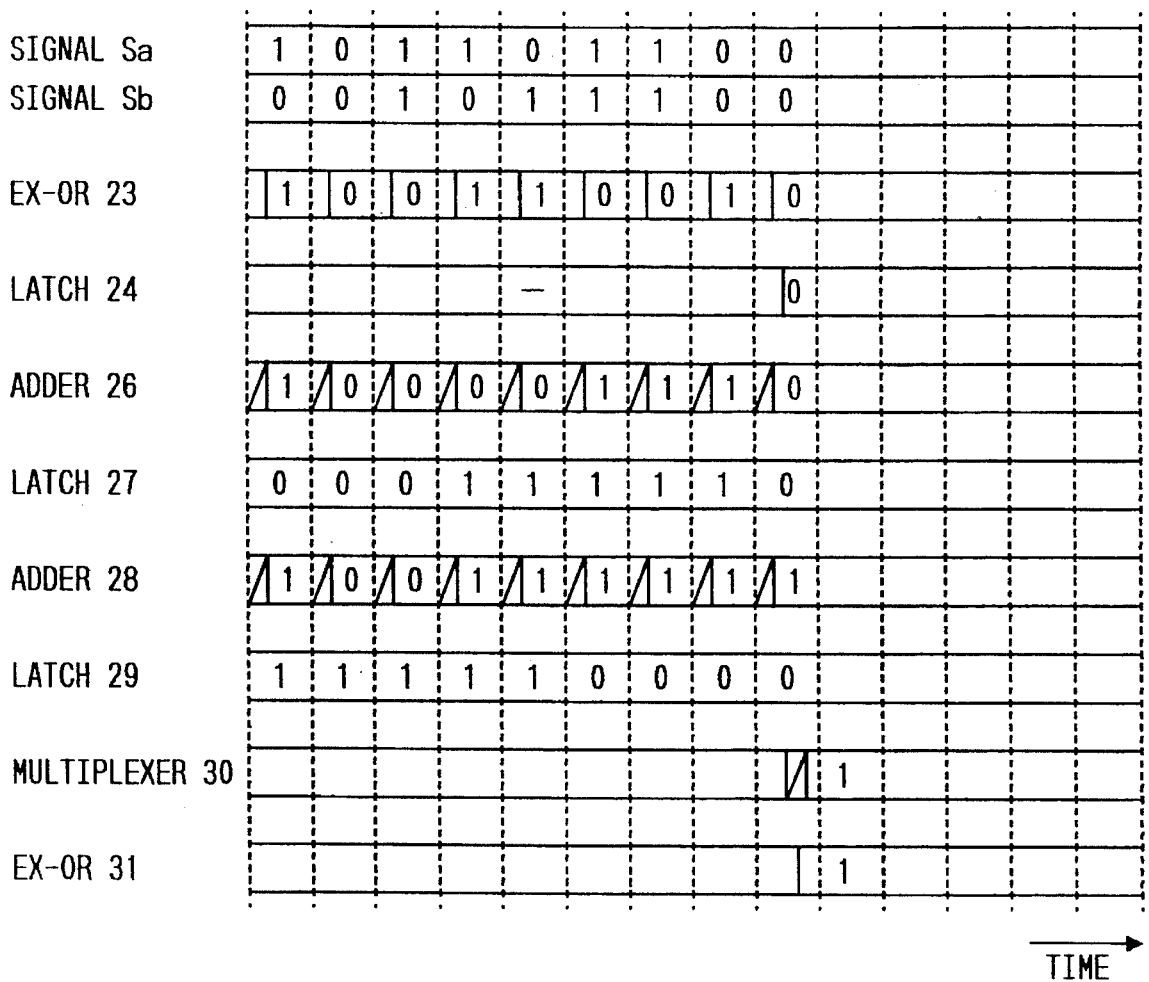

| SIGNAL Sa | SIGNAL Sb | RELATION BETWEEN Sa AND Sb | SIGNAL Sc |
|---|---|---|---|
| $0\leq$ | $0\leq$ | $|Sa|\geq|Sb|$ | 0 |
| $0\leq$ | $0\leq$ | $|Sa|<|Sb|$ | 1 |
| $0\leq$ | NEGATIVE | $|Sa|\geq|Sb|$ | 0 |
| $0\leq$ | NEGATIVE | $|Sa|<|Sb|$ | 1 |
| NEGATIVE | $0\leq$ | $|Sa|>|Sb|$ | 0 |
| NEGATIVE | $0\leq$ | $|Sa|\leq|Sb|$ | 1 |
| NEGATIVE | NEGATIVE | $|Sa|>|Sb|$ | 0 |
| NEGATIVE | NEGATIVE | $|Sa|\leq|Sb|$ | 1 |

APPARATUS FOR CALCULATING THE SQUARE ROOT OF THE SUM OF TWO SQUARES

BACKGROUND OF THE INVENTION

1. Field of the Invention

This invention relates to an apparatus for calculating the square root of the sum of the square of the value represented by a first digital signal and the square of the value represented by a second digital signal.

2. Description of the Prior Art

In digital signal processing, some calculations are intended to derive the square root So of the sum of the square of a first value represented by a first digital signal and the square of a second value represented by a second digital signal. Specifically, the square root So is expressed as $So = \sqrt{A^2+B^2}$ where "A" denotes the value represented by the first digital signal and "B" denotes the value represented by the second digital signal.

As will be described later, prior-art apparatuses for such calculations tend to be complicated in structure.

SUMMARY OF THE INVENTION

It is an object of this invention to provide an improved calculation apparatus.

This invention provides a calculation apparatus comprising first means for processing a first digital signal of a serial form into a second digital signal of a serial form, the second digital signal representing an absolute value of a value represented by the first digital signal; second means for processing a third digital signal of a serial form into a fourth digital signal of a serial form, the fourth digital signal representing an absolute value of a value represented by the third digital signal; third means for comparing the values represented by the first and third digital signals, and generating a comparison-result digital signal representing a result of said comparing; and fourth means for generating a calculation-result digital signal of a serial form in response to the second digital signal, the fourth digital signal, and the comparison-result digital signal, the calculation-result digital signal representing a value which is approximate to a square root of a sum of a square of the value represented by the first digital signal and a square of the value represented by the third digital signal.

It is preferable that the first means comprises a shift register for temporarily storing the first digital signal; a first latch for latching an MSB of the first digital signal; an Exclusive-OR circuit for executing Exclusive-OR operation between an output signal from the shift register and an output signal from the first latch; a second latch for latching the MSB of the first digital signal as an initial value; and a 1-bit adder for adding an output signal from the Exclusive-OR circuit and an output signal from the second latch, and generating the second digital signal; wherein the second latch is operative for latching a carry signal generated by the adder.

It is preferable that the second means comprises a shift register for temporarily storing the third digital signal; a first latch for latching an MSB of the third digital signal; an Exclusive-OR circuit for executing Exclusive-OR operation between an output signal from the shift register and an output signal from the first latch; a second latch for latching the MSB of the third digital signal as an initial value; and a 1-bit adder for adding an output signal from the Exclusive-OR circuit and an output signal from the second latch, and generating the fourth digital signal; wherein the second latch is operative for latching a carry signal generated by the adder.

It is preferable that the third means comprises a first Exclusive-OR circuit for executing Exclusive-OR operation between the first digital signal and the third digital signal; a first latch for latching an output signal from the first Exclusive-OR circuit; an inverter for inverting the third digital signal; a first 1-bit adder for adding the first digital signal and the second digital signal; a second latch for latching a carry signal generated by the first adder; a second 1-bit adder for adding the first digital signal an output signal from the inverter; a third latch for latching a carry signal generated by the second adder; a multiplexer for selecting one of an output signal from the first adder and an output signal from the second adder in response to an output signal from the first latch; and a second Exclusive-OR circuit for executing Exclusive-OR operation between the first digital signal and an output signal from the multiplexer, and for generating the comparison-result signal in response to the first digital signal and the output signal from the multiplexer.

It is preferable that the fourth means comprises a first multiplexer for selecting one of the second digital signal and the fourth digital signal in response to the comparison-result signal; a second multiplexer for selecting one of the second digital signal and the fourth digital signal in response to the comparison-result signal; a first series combination of flip-flops successively storing an output signal from the first multiplexer; a second series combination of flip-flops successively storing an output signal from the second multiplexer; a first 1-bit adder for adding am output signal from the first combination of the flip-flops and the output signal from the second multiplexer; a first latch for latching a carry signal generated by the first adder; a second 1-bit adder for adding output signals from given flip-flops in the second combination; a second latch for latching a carry signal generated by the second adder; a third 1-bit adder for adding an output signal from the second combination of the flip-flops and an output signal from the second adder; a third latch for latching a carry signal generated by the third adder; a fourth 1-bit adder for adding an output signal from the first adder and an output signal from the third adder; and a fourth latch for latching a carry signal generated by the fourth adder.

BRIEF DESCRIPTION OF THE DRAWINGS

FIG. 8 is a time-domain diagram of various signals in the absolute-value comparator of FIG. 5.

FIG. 9 is a diagram of the relation among the values represented by input digital signals Sa and Sb, and the logic state of the output signal from a multiplexer 30 in the absolute-value comparator of FIG. 5.

DESCRIPTION OF THE PREFERRED EMBODIMENTS

Prior-art calculation apparatuses will now be described for a better understanding of this invention.

Figure 1:
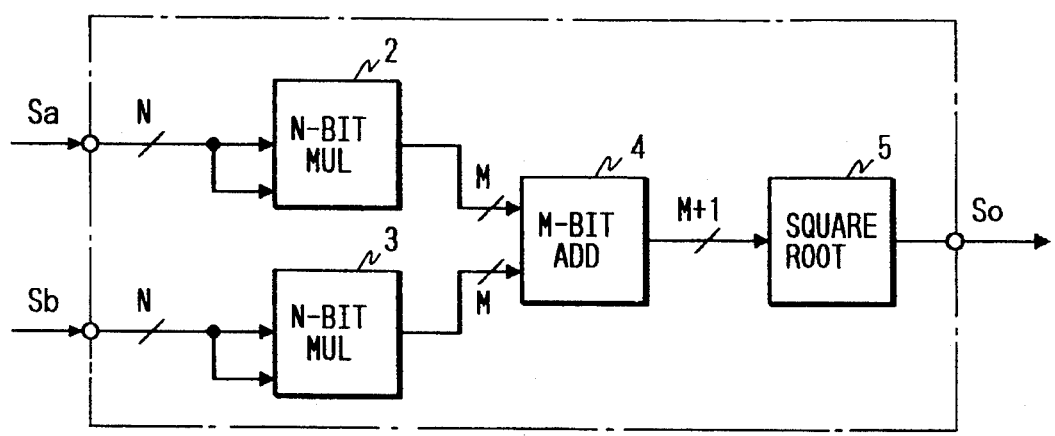
FIG. 1 is a block diagram of a first prior-art calculation apparatus.

FIG. 1 shows a first prior-art calculation apparatus. As shown in FIG. 1, the first prior-art calculation apparatus includes N-bit multipliers 2 and 3, an M-bit adder 4, and a square root calculator 5, where "N" and "M" denote given natural numbers respectively.

An input N-bit digital signal Sa having a parallel form is applied to the multiplier 2 while another input N-bit digital signal Sb having a parallel form is applied to the other multiplier 3. The multiplier 2 calculates the square "Sa$^2$" of the value represented by the digital signal Sa, and outputs an M-bit digital signal indicating the calculated square "Sa$^2$". The multiplier 3 calculates the square "Sb$^2$" of the value represented by the digital signal Sb, and outputs an M-bit digital signal indicating the calculated square "Sb$^2$".

The adder 4 receives the output signals from the multipliers 2 and 3, and calculates the sum "Sa$^2$+Sb$^2$" of the values "Sa$^2$" and "Sb$^2$" represented by the output signals from the multipliers 2 and 3. The adder 4 outputs an (M+1)-bit digital signal indicating the calculated sum "Sa$^2$+Sb$^2$".

The square root calculator 5 receives the output signal from the adder 4, and calculates the square root "$=\overline{Sa^2+Sb^2}$" of the value "Sa$^2$+Sb$^2$" represented by the output signal from the adder 4. The square root calculator 5 outputs a digital signal So indicating the calculated square root "$=\overline{Sa^2+Sb^2}$".

Figure 2:
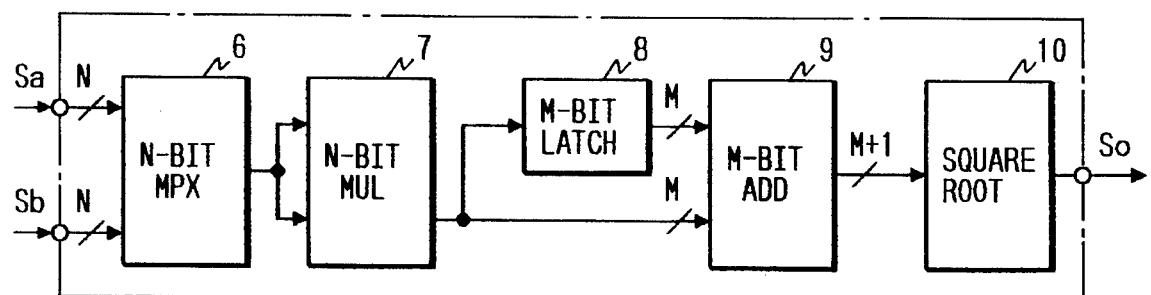
FIG. 2 is a block diagram of a second prior-art calculation apparatus.

FIG. 2 shows a second prior-art calculation apparatus. As shown in FIG. 2, the second prior-art calculation apparatus includes an N-bit multiplexer 6, an N-bit multiplier 7, an M-bit latch 8, an M-bit adder 9, and a square root calculator 10, where "N" and "M" denote given natural numbers respectively.

An input N-bit digital signal Sa having a parallel form, and an input N-bit digital signal Sb having a parallel form are applied to the multiplexer 6. The multiplexer 6 sequentially selects the digital signal Sa or the digital signal Sb, and passes the selected signal to the multiplier 7. When the multiplexer 6 selects the digital signal Sa and passes it to the multiplier 7, the multiplier 7 calculates the square "Sa$^2$" of the value represented by the digital signal Sa and outputs an M-bit digital signal indicating the calculated square "Sa$^2$". The latch 8 receives and holds the output signal from the multiplier 7 which represents the calculated square "Sa$^2$". When the multiplexer 6 selects the digital signal Sb and passes it to the multiplier 7, the multiplier 7 calculates the square "Sb$^2$" of the value represented by the digital signal Sb and outputs an M-bit digital signal indicating the calculated square "Sb$^2$". In this case, the adder 9 receives the output signal from the multiplier 7 which represents the calculated square "Sb$^2$". At the same time, the adder 9 receives the output signal from the latch 8 which represents the calculated square "Sa$^2$".

The adder 9 calculates the sum "Sa$^2$+Sb$^2$" of the values "Sa$^2$" and "Sb$^2$" represented by the output signals from the multiplier 7 and the latch 8. The adder 9 outputs an (M+1)-bit digital signal indicating the calculated sum "Sa$^2$+Sb$^2$".

The square root calculator 10 receives the output signal from the adder 9, and calculates the square root "$=\overline{Sa^2+Sb^2}$" of the value "Sa$^2$+Sb$^2$" represented by the output signal from the adder 9. The square root calculator 10 outputs a digital signal So indicating the calculated square root "$=\overline{Sa^2+Sb^2}$".

Figure 3:
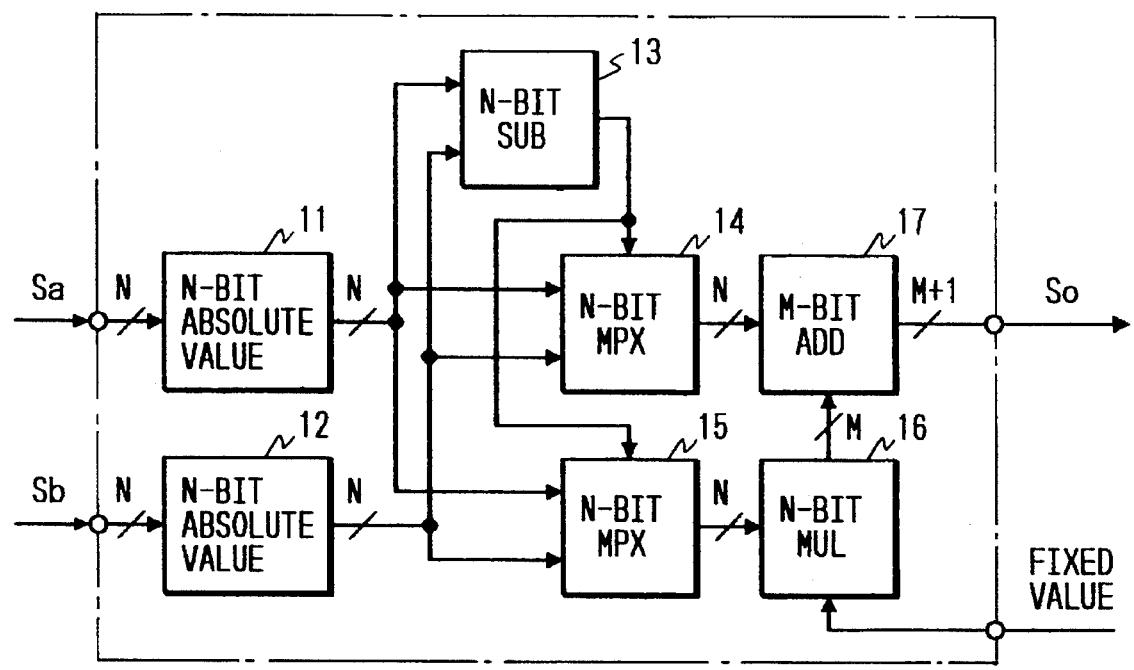
FIG. 3 is a block diagram of an approximate calculation apparatus.

FIG. 3 shows an approximate calculation apparatus which is not prior art against this invention. As shown in FIG. 3, the approximate calculation apparatus includes N-bit absolute-value calculators 11 and 12, an N-bit subtracter 13, N-bit multiplexers 14 and 15, an N-bit multiplier 16, and an M-bit adder 17, where "N" and "M" denote given natural numbers respectively.

The approximate calculation apparatus of FIG. 3 is designed to operate on input N-bit digital signals Sa and Sb of a parallel form which represent an in-phase component and a quadrature component of a constant-envelope analog signal respectively. In this case, the square root of the sum of the square of the value "A" represented by the digital signal Sa and the square of the value "B" represented by the digital signal Sb is approximately given by the following equation.

$$\sqrt{A^2+B^2} \approx \text{MAX}(|A|,|B|) + \text{MIN}(|A|,|B|) \times (\sqrt{2}-1) \quad (1)$$

where MAX denotes an operator for selecting the greatest of two in the following parentheses, and MIN denotes an operator for selecting the smallest of two in the following parentheses.

The input N-bit digital signal Sa is applied to the absolute-value calculator 11 while the other input N-bit digital signal Sb is applied to the absolute-value calculator 12. The device 11 calculates the absolute value "|A|" of the value "A" represented by the digital signal Sa, and outputs an N-bit digital signal indicating the calculated absolute value "|A|". The device 12 calculates the absolute value "|B|" of the value "B" represented by the digital signal Sb, and outputs an N-bit digital signal indicating the calculated absolute value "|B|".

The subtracter 13 receives the output signals from the absolute-value calculators 11 and 12, and calculates a difference between the values "|A|" and "|B|" represented by the received signals. The subtracter 13 decides which of the values "|A|" and "|B|" is greater, and outputs a digital signal representing the result of the decision. The subtracter 13 may be replaced by a comparator.

The multiplexer 14 receives the output signals from the absolute-value calculators 11 and 12. Also, the multiplexer 14 receives the output signal from the subtracter 13. The multiplexer 14 selects one of the output signals from the absolute-value calculators 11 and 12 in response to the output signal from the subtracter 13, and passes the selected signal to the adder 17. Specifically, the multiplexer 14 selects one of the output signals from the absolute-value calculators 11 and 12 which corresponds to the greater of the values "|A|" and "|B|". Thus, the multiplexer 14 has the function corresponding to the term "MAX(|A|, |B|)" in the equation (1).

The multiplexer 15 receives the output signals from the absolute-value calculators 11 and 12. Also, the multiplexer 15 receives the output signal from the subtracter 13. The multiplexer 15 selects one of the output signals from the absolute-value calculators 11 and 12 in response to the output signal from the subtracter 13, and passes the selected signal to the multiplier 16. Specifically, the multiplexer 15 selects one of the output signals from the absolute-value calculators 11 and 12 which corresponds to the smaller of the values "|A|" and "|B|". Thus, the multiplexer 15 has the function corresponding to the term "MIN(|A|, |B|)" in the equation (1).

The multiplier 16 receives the output signal from the multiplexer 15 which represents the value "MIN(|A|, |B|)". Also, the multiplier 16 receives an output digital signal from a register or memory (not shown) which represents a fixed value of $= \overline{2}-1$. The multiplier 16 calculates the product of the value "MIN(|A|, |B|)" and the value "$= \overline{2}-1$", and outputs a digital signal indicating the calculated product "MIN(|A|, |B|)×($= \overline{2}-1$)".

The adder 17 receives the output signal from the multiplexer 14 which represents the value "MAX(|A|, |B|)". Also, the adder 17 receives the output signal from the multiplier 16 which represents the value "MIN(|A|, |B|)×($= \overline{2}-1$)". The adder 17 calculates the sum of the values represented by the output signals from the multiplexer 14 and the multiplier 16, and outputs a digital signal So indicating the calculated sum "MAX(|A|, |B|)+MIN(|A|, |B|)×($= \overline{2}-1$)". In this way, the adder 17 outputs a digital signal So representing the right-hand side of the equation (1) which is approximate to the value "$= \overline{A^2+B^2}$".

In cases where the bit number "N" of the input digital signals Sa and Sb is great, the prior-art calculation apparatuses of FIGS. 1 and 2 and the approximate calculation apparatus of FIG. 3 tend to be complicated in structure since the adders and the multipliers therein need large numbers of gates.

Figure 4:
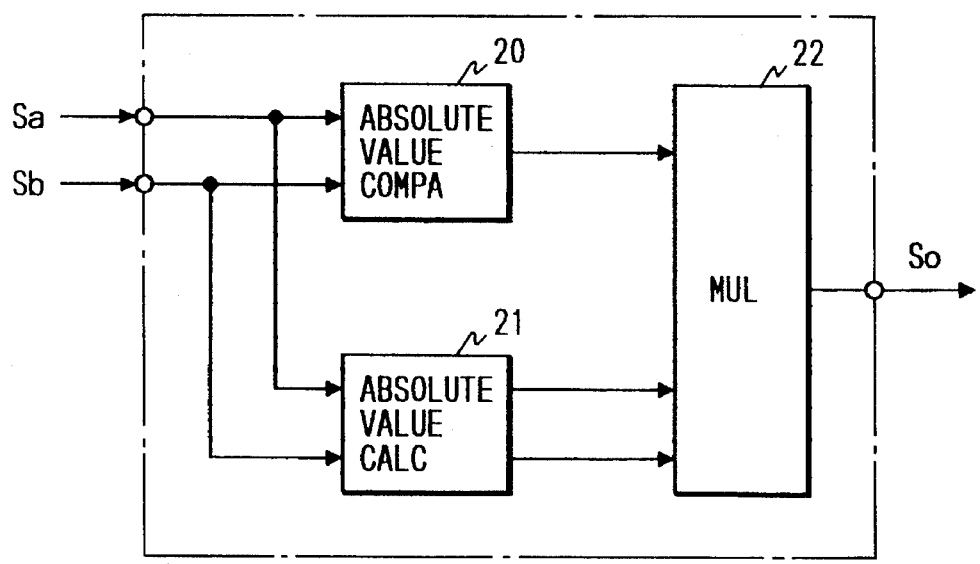
FIG. 4 is a block diagram of a calculation apparatus according to a first embodiment of this invention.

FIG. 4 shows a calculation apparatus according to a first embodiment of this invention. As shown in FIG. 4, the calculation apparatus includes an absolute-value comparator 20, an absolute-value calculator 21, and a multiplier 22.

The absolute-value comparator 20 and the absolute-value calculator 21 are connected to the multiplier 22. Input digital signals Sa and Sb having a serial form are applied to the absolute-value comparator 20 and the absolute-value calculator 21. The absolute-value comparator 20 generates a digital signal Sc in response to the input digital signals Sa and Sb, and outputs the generated signal Sc to the multiplier 22. The absolute-value calculator 21 generates digital signals Sd and Se in response to the input digital signals Sa and Sb, and outputs the generated signals Sd and Se to the multiplier 22. The multiplier 22 generates a digital signal So in response to the digital signals Sc, Sd, and Se, and outputs the generated digital signal So.

Figure 5:
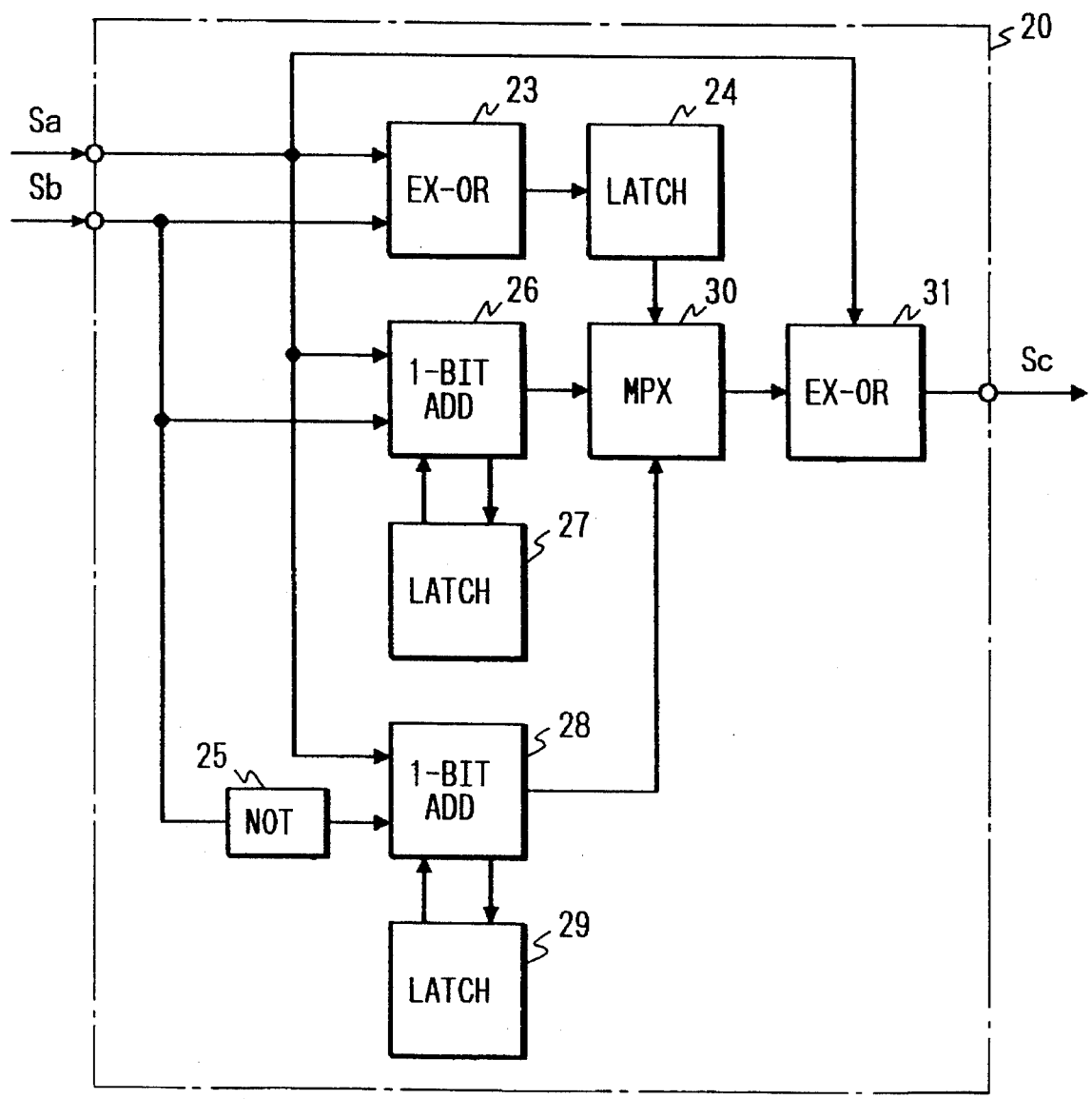
FIG. 5 is a block diagram of an absolute-value comparator in FIG. 4.

As shown in FIG. 5, the absolute-value comparator 20 includes an Exclusive-OR circuit 23, a latch 24, a NOT circuit (an inverter) 25, a 1-bit adder 26, a latch 27, a 1-bit adder 28, a latch 29, a multiplexer 30, and an Exclusive-OR circuit 31.

The input digital signals Sa and Sb are applied to first and second input sides of the Exclusive-OR circuit 23 respectively. The output side of the Exclusive-OR circuit 23 is connected to the input side of the latch 24. The output side of the latch 24 is connected to a control terminal of the multiplexer 30. The input digital signals Sa and Sb are applied to first and second input sides of the adder 26 respectively. The output side of the adder 26 is connected to a first input side of the multiplexer 30. A carry terminal of the adder 26 is connected to the latch 27. The input digital signal Sa is applied to a first input side of the adder 28. The input digital signal Sb is applied to the input side of the NOT circuit 25. The output side of the NOT circuit 25 is connected to a second input side of the adder 28. The output side of the adder 28 is connected to a second input side of the multiplexer 30. A carry terminal of the adder 28 is connected to the latch 29. The output side of the multiplexer 30 is connected to a first input side of the Exclusive-OR circuit 31. A second input side of the Exclusive-OR circuit 31 is subjected to the input digital signal Sa. The output side of the Exclusive-OR circuit 31 is followed by the multiplier 22 of FIG. 4.

The circuit 23 executes Exclusive-OR operation between the input digital signals Sa and Sb. The output signal from the Exclusive-OR circuit 23 is held by the latch 24 before being transmitted to the multiplexer 30. The device 26 adds the input digital signals Sa and Sb. The output signal from the adder 26 is fed to the multiplexer 30. The latch 27 holds a carry signal generated by the adder 26. The input digital signal Sb is inverted by the NOT circuit 25. The output signal from the NOT circuit 25 is applied to the adder 28. The device 28 adds the input digital signal Sa and the output signal from the NOT circuit 25. The output signal from the adder 28 is fed to the multiplexer 30. The latch 29 holds a carry signal generated by the adder 28. The multiplexer 30 selects one of the output signals from the adders 26 and 28 in response to the output signal from the latch 24, and passes the selected signal to the Exclusive-OR circuit 31. The circuit 31 executes Exclusive-OR operation between the input digital signal Sa and the output signal from the multiplexer 30. The output signal from the Exclusive-OR circuit 31 is used as a signal Sc fed to the multiplier 22 of FIG. 4.

Figure 6:
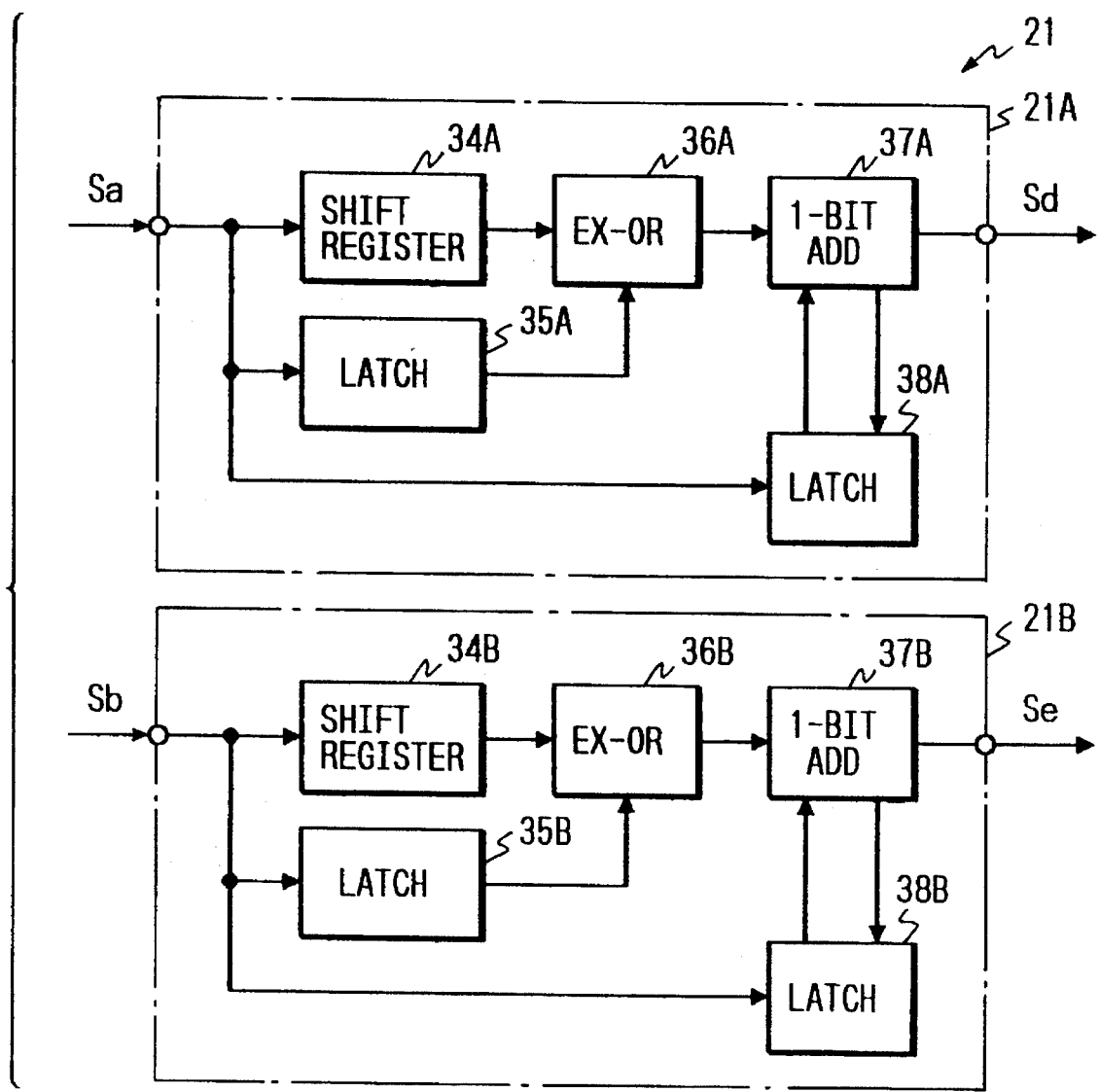
FIG. 6 is a block diagram of an absolute-value calculator in FIG. 4.

As shown in FIG. 6, the absolute-value calculator 21 is separated into first and second portions 21A and 21B which operate on the input digital signals Sa and Sb respectively.

The first portion 21A of the absolute-value calculator 21 includes a shift register 34A, a latch 35A, an Exclusive-OR circuit 36A, a 1-bit adder 37A, and a latch 38A.

The input digital signal Sa is applied to the input side of the shift register 34A. The output side of the shift register 34A is connected to a first input side of the Exclusive-OR circuit 36A. The input digital signal Sa is applied to the input side of the latch 35A. The output side of the latch 35A is connected to a second input side of the Exclusive-OR circuit 36A. The output side of the Exclusive-OR circuit 36A is connected to the input side of the adder 37A. The output side of the adder 37A is followed by the multiplier 22 of FIG. 4. A carry terminal of the adder 37A is connected to the latch 38A. The input digital signal Sa is applied to the latch 38A.

Sequential bits of the input digital signal Sa are written into the shift register 34A one by one, being shifted from storage segments to subsequent storage segments in the shift register 34A before being outputted from the shift register 34A one by one. Thus, the shift register 34A delays the input digital signal Sa by a predetermined time. The output signal from the shift register 34A, that is, the delay-resultant signal, is fed to the Exclusive-OR circuit 36A. The highest bit (sign bit, MSB) of the input digital signal Sa is held by the latch 35A before being fed to the Exclusive-OR circuit 36A. The circuit 36A executes Exclusive-OR operation between the output signals from the shift register 34A and the latch 35A. The output signal from the Exclusive-OR circuit 36A is fed to the adder 37A. The highest bit (sign bit, MSB) of the input digital signal Sa is stored into the latch 38A to initialize the latch 38A. The device 37A adds the output signals from the Exclusive-OR circuit 36A and the latch 38A. The latch 38A holds a carry signal generated by the adder 37A. The output signal from the adder 37A is used as a signal Sd fed to the multiplier 22 of FIG. 4.

The second portion 21B of the absolute-value calculator 21 includes a shift register 34B, a latch 35B, an Exclusive-OR circuit 36B, a 1-bit adder 37B, and a latch 38B.

The input digital signal Sb is applied to the input side of the shift register 34B. The output side of the shift register 34B is connected to a first input side of the Exclusive-OR circuit 36B. The input digital signal Sb is applied to the input side of the latch 35B. The output side of the latch 35B is connected to a second input side of the Exclusive-OR circuit 36B. The output side of the Exclusive-OR circuit 36B is connected to the input side of the adder 37B. The output side of the adder 37B is followed by the multiplier 22 of FIG. 4. A carry terminal of the adder 37B is connected to the latch 38B. The input digital signal Sb is applied to the latch 38B.

Sequential bits of the input digital signal Sb are written into the shift register 34B one by one, being shifted from storage segments to subsequent storage segments in the shift register 34B before being outputted from the shift register 34B one by one. Thus, the shift register 34B delays the input digital signal Sb by a predetermined time. The output signal from the shift register 34B, that is, the delay-resultant signal, is fed to the Exclusive-OR circuit 36B. The highest bit (sign bit, MSB) of the input digital signal Sb is held by the latch 35B before being fed to the Exclusive-OR circuit 36B. The circuit 36B executes Exclusive-OR operation between the output signals from the shift register 34B and the latch 35B. The output signal from the Exclusive-OR circuit 36B is fed to the adder 37B. The highest bit (sign bit, MSB) of the input digital signal Sb is stored into the latch 38B to initialize the latch 38B. The device 37B adds the output signals from the Exclusive-OR circuit 36B and the latch 38B. The latch 38B holds a carry signal generated by the adder 37B. The output signal from the adder 37B is used as a signal Se fed to the multiplier 22 of FIG. 4.

Figure 7:
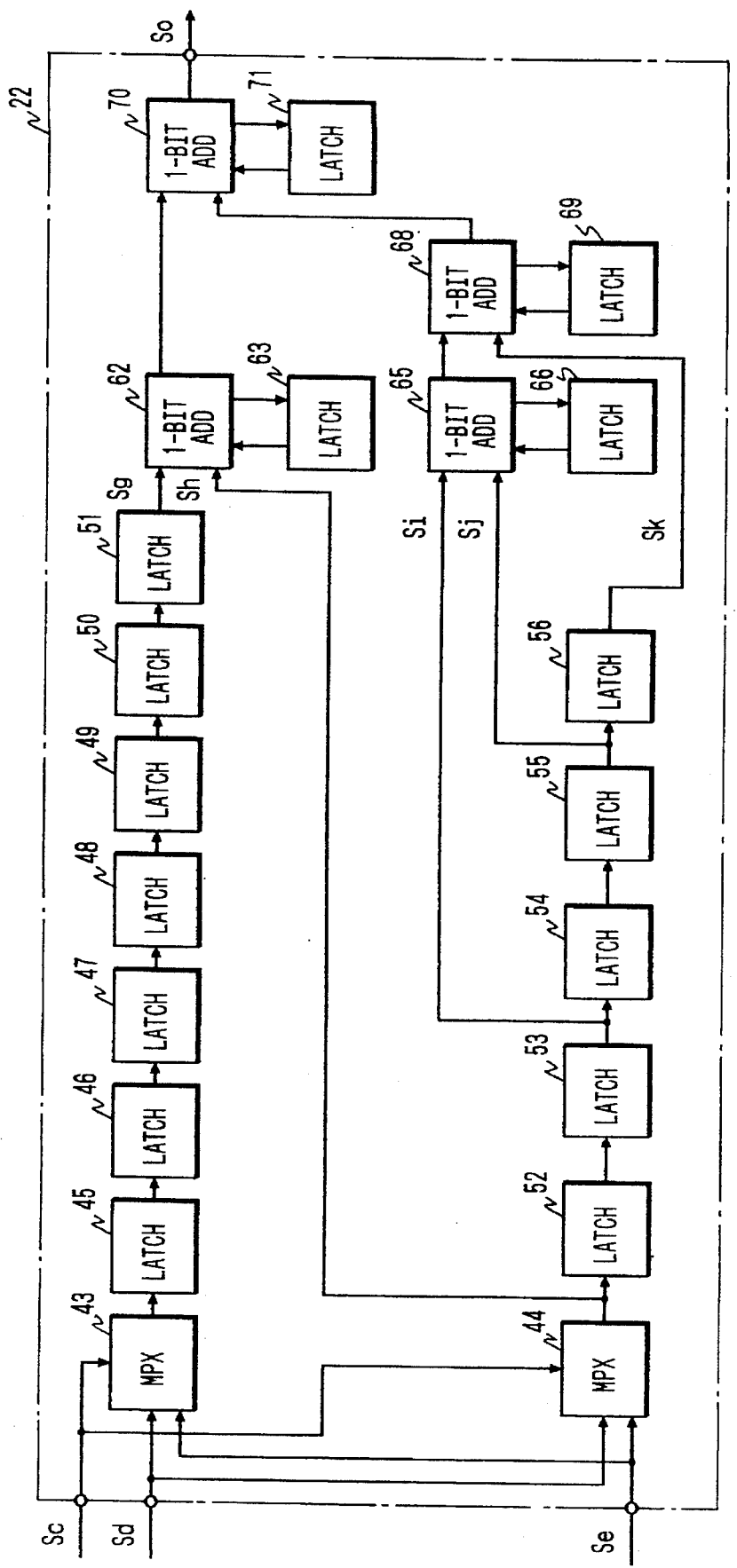
FIG. 7 is a block diagram of a multiplier in FIG. 4.

As shown in FIG. 7, the multiplier 22 includes multiplexers 43 and 44, latches 45, 46, 47, 48, 49, 50, 51, 52, 53, 54, 55, and 56, 1-bit adders 62, 65, 68, and 70, and latches 63, 66, 69, and 71.

The output signals Sd and Se from the absolute-value calculator 21 are applied to first and second input sides of the multiplexer 43 respectively. The output signal Sc from the absolute-value comparator 20 is applied to a control terminal of the multiplexer 43. The output signals Sd and Se from the absolute-value calculator 21 are applied to first and second input sides of the multiplexer 44 respectively. The output signal Sc from the absolute-value comparator 20 is applied to a control terminal of the multiplexer 44. The output terminal of the multiplexer 43 is successively followed by the latches 45, 46, 47, 48, 49, 50, and 51. The output side of the latch 51 is connected to a first input side of the adder 62. The output terminal of the multiplexer 44 is successively followed by the latches 52, 53, 54, 55, and 56. The output side of the multiplexer 44 is also connected to a second input side of the adder 62. A carry terminal of the adder 62 is connected to the latch 63. The output side of the latch 53 is connected to a first input side of the adder 65. The output side of the latch 55 is connected to a second input side of the adder 65. A carry terminal of the adder 65 is connected to the latch 66. The output side of the adder 65 is connected to a first input side of the adder 68. The output side of the latch 56 is connected to a second input side of the adder 68. A carry terminal of the adder 68 is connected to the latch 69. The output side of the adder 62 is connected to a first input side of the adder 70. The output side of the adder 68 is connected to a second input side of the adder 70. A carry terminal of the adder 70 is connected to the latch 71. The adder 70 outputs a digital signal So.

The multiplexer 43 selects one of the output signals Sd and Se from the absolute-value calculator 21 in response to the output signal Sc from the absolute-value comparator 20, and passes the selected signal to the latch 45. The output signal from the multiplexer 43 is successively held by the latches 45, 46, 47, 48, 49, 50, and 51 before being outputted from the latch 51. The combination of the latches 45–51 delays the output signal from the multiplexer 43 by a predetermined time. Each of the latches 45–51 includes a flip-flop. The output signal Sg from the latch 51, that is, the delay-resultant signal, is fed to the adder 62.

The multiplexer 44 selects one of the output signals Sd and Se from the absolute-value calculator 21 in response to the output signal Sc from the absolute-value comparator 20, and passes the selected signal Sh to the latch 52 and the adder 62. The output signal Sh from the multiplexer 44 is successively held by the latches 52, 53, 54, 55, and 56 before being outputted from the latch 56. The combination of the latches 52–56 delays the output signal Sh from the multiplexer 44 by a predetermined time. Each of the latches 52–56 includes a flip-flop. The output signal Sk from the latch 56, that is, the delay-resultant signal, is fed to the adder 68. The output signal Si from the latch 53 is fed to the adder 65. The output signal Sj from the latch 55 is fed to the adder 65.

The device 62 adds the output signal Sg from the latch 51 and the output signal Sh from the multiplexer 44. The latch 63 holds a carry signal generated by the adder 62. The output signal from the adder 62 is fed to the adder 70. The device 65 adds the output signal Si from the latch 53 and the output signal Sj from the latch 55. The latch 66 holds a carry signal generated by the adder 65. The output signal from the adder 65 is fed to the adder 68. The device 68 adds the output signal from the adder 65 and the output signal Sk from the latch 56. The latch 69 holds a carry signal generated by the adder 68. The output signal from the adder 68 is fed to the adder 70. The device 70 adds the output signals from the adders 62 and 68. The latch 71 holds a carry signal generated by the adder 70. The output signal from the adder 70 is used as a digital signal So representing a final calculation result.

The calculation apparatus of FIG. 4 operates as follows. As previously described, the input digital signal Sa and Sb having a serial form are applied to the absolute-value comparator 20 and the absolute-value calculator 21. The device 20 compares the absolute value of the value "A" represented by the input digital signal Sa and the absolute value of the value "B" represented by the input digital signal Sb. In other words the device 20 decides which of the absolute values of the values "A" and "B" represented by the input digital signals Sa and Sb is greater. The absolute-value comparator 20 outputs a digital signal Sc representing the result of the comparison or decision. The device 21 calculates the absolute value of the value "A" represented by the input digital signal Sa, and outputs a digital signal Sd indicating the calculated absolute value "|A|". In addition, the device 21 calculates the absolute value of the value "B" represented by the input digital signal Sb, and outputs a digital signal Se indicating the calculated absolute value "|B|". The multiplier 22 receives the output signals Sc, Sd, and Se from the absolute-value comparator 20 and the absolute-value calculator 21. The multiplier 22 processes the output signals Sd and Se from the absolute-value comparator 20 in a predetermined way corresponding to the right-hand side of the equation (1). During the signal processing by the multiplier 22, selections of one of the value "|A|" and the values "|B|" are executed in response to the output signal Sc from the absolute-value comparator 20. The multiplier 22 generates a digital signal So representative of a calculation result in response to the signals Sc, Sd, and Se. The multiplier 22 outputs the generated digital signal So. The calculation-result digital signal So corresponds to the right-hand side of the equation (1) which is multiplied by "$2^7$". In cases where the input digital signals Sa and Sb represent an in-phase component and a quadrature component of a constant-envelope analog signal respectively, the value represented by the calculation-result signal So is approximate to the value "$2^7 \times = \overline{A^2 + B^2}$".

Operation of the absolute-value comparator 20 of FIG. 5 will now be described with reference to FIG. 8. The lowest bit (LSB) to the highest bit (MSB) of the input digital signal Sa are sequentially applied to the absolute-value comparator 20 one by one. In addition, the lowest bit (LSB) to the highest bit (MSB) of the input digital signal Sb are sequentially applied to the absolute-value comparator 20 one by one. The input digital signals Sa and Sb applied to the absolute-value comparator 20 are synchronous with each other. Under an example of conditions which is shown in FIG. 8, the logic state of the input digital signal Sa periodically changes as "1→0→1→1→0→1→1→0→0" while the logic state of the input digital signal Sb periodically changes as "0→0→1→0→1→1→0→0".

The adder 26 executes the addition of the input digital signals Sa and Sb while referring to the digital signal read out from the carry latch 27. It should be noted that the digital signal in the carry latch 27 is set to "0" at an initial stage. The lowest bit (LSB) to the highest bit (MSB) of the addition-result-representing signal are sequentially applied from the adder 26 to the multiplexer 30 one by one.

The input digital signal Sb is inverted by the NOT circuit 25. The NOT circuit 25 outputs the inversion of the input digital signal Sb to the adder 28. The adder 28 executes the subtraction between the input digital signals Sa and Sb while referring to the digital signal read out from the carry latch 29. It should be noted that the digital signal In the carry latch 29 is set to "1" at an initial stage. The lowest bit (LSB) to the highest bit (MSB) of the subtraction-result-representing signal are sequentially applied from the adder 28 to the multiplexer 30 one by one.

The device 23 executes Exclusive-OR operation between the input digital signals Sa and Sb. When the processing of the highest bits (MSB) of the Input digital signals Sa and Sb has been completed in the adders 26 and 28, the output signal from the Exclusive-OR circuit 23 is sampled and held by the latch 24. The latch 24 outputs the held signal to the multiplexer 30. The latch 24 may be omitted provided that suitable time-base adjustment is present. The multiplexer 30 selects one of the output signals from the adders 26 and 28 in response to the output signal from the latch 24, and passes the selected signal to the Exclusive-OR circuit 31.

FIG. 9 shows the relation among the values represented by the input digital signals Sa and Sb, and the logic state of the output signal from the multiplexer 30 which occurs when the processing of the highest bits (MSB) of the input digital signals Sa and Sb has been completed in the adders 26 and 28.

The Exclusive-OR circuit 31 receives the output signal from the multiplexer 30. Also, the Exclusive-OR circuit 31 receives the input digital signal Sa. The device 31 executes Exclusive-OR operation between the input digital signal Sa and the output signal from the multiplexer 30. The output signal Sc from the Exclusive-OR circuit 31 is fed to the multiplier 22 of FIG. 4.

Figures 10, 11:
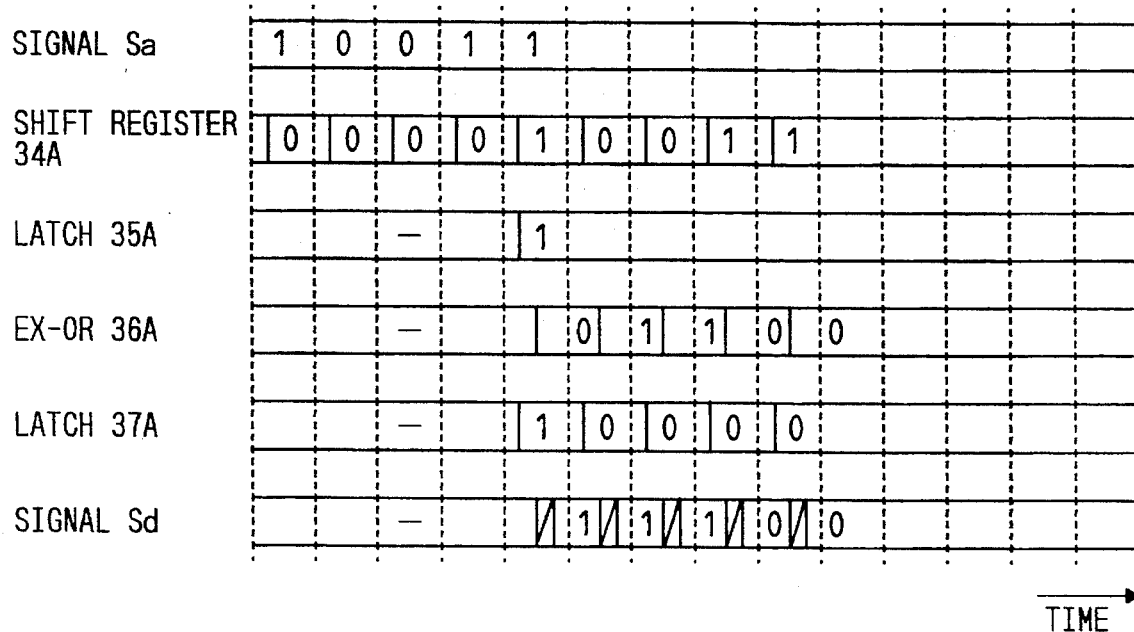
FIG. 10 is a diagram of the relation among the values represented by the input digital signals Sa and Sb, and the logic state of the output signal Sc from an Exclusive-OR circuit 31 in the absolute-value comparator of FIG. 5.
FIG. 11 is a time-domain diagram of various signals in the absolute-value calculator of FIG. 6.

FIG. 10 shows the relation among the values represented by the input digital signals Sa and Sb, and the logic state of the output signal Sc from the Exclusive-OR circuit 31. As shown in FIG. 10, the logic state of the output signal Sc from the Exclusive-OR circuit 31 is "0" when the absolute value "|Sa|" of the value represented by the input digital signal Sa is greater than the absolute value "|Sb|" of the value represented by the input digital signal Sb. The logic state of the output signal Sc from the Exclusive-OR circuit 31 is "1" when the absolute value "|Sa|" of the value represented by the input digital signal Sa is smaller than the absolute value "|Sb|" of the value represented by the input digital signal Sb. The logic state of the output signal Sc from the Exclusive-OR circuit 31 is "0" or "1" when the absolute value "|Sa|" of the value represented by the input digital signal Sa is equal to the absolute value "|Sb|" of the value represented by the input digital signal Sb.

Under the example of conditions which is shown in FIG. 8, the input digital signal Sa is "001101101" along the direction from MSB to LSB while the input digital signal Sb is "001110100". Accordingly, the absolute value "|Sa|" of the value represented by the input digital signal Sa is smaller than the absolute value "|Sb|" of the value represented by the input digital signal Sb. Thus, in this case, the logic state of the output signal Sc from the Exclusive-OR circuit 31 is "1".

Operation of the first portion 21A of the absolute-value calculator 21 will now be described with reference to FIGS. 6 and 11. The lowest bit (LSB) to the highest bit (MSB) of the input digital signal Sa are sequentially applied to the first portion 21A of the absolute-value calculator 21 one by one. Under an example of conditions which is shown in FIG. 11, the logic state of the input digital signal Sa periodically changes as "1→0→0→1→1". The input digital signal Sa is stored into the shift register 34A before being outputted from the shift register 34A to the Exclusive-OR circuit 36A. The shift register 34A delays the input digital signal Sa by a predetermined time corresponding to a 4-bit time. The latch 35A samples and holds the highest bit (MSB) of the input digital signal Sa which represents the sign of the value represented by the input digital signal Sa. The latch 35A outputs the held sign-bit signal to the Exclusive-OR circuit 36A. The device 36A executes Exclusive-OR operation between the output signals from the shift register 34A and the latch 35A. The output signal from the Exclusive-OR circuit 36A is fed to the adder 37A. When the sign-bit signal indicates that the value represented by the input digital signal Sa is positive, the output signal from the shift register 34A passes through the Exclusive-OR circuit 36A and then reaches the adder 37A without being changed by the Exclusive-OR circuit 36A. When the sign-bit signal indicates that the value represented by the input digital signal Sa is negative, every bit of the output signal from the shift register 34A is inverted by the Exclusive-OR circuit 36A so that the inversion of the output signal from the shift register 34A is fed to the adder 37A.

The device 37A adds the output signal from the Exclusive-OR circuit 36A and the output signal from the latch 38A. During an initial stage, the highest bit (sign bit, MSB) of the input digital signal Sa is set in the latch 38A. During a later period, the latch 38A holds a carry signal generated by the adder 37A. The output signal Sd from the adder 37A indicates the absolute value of the value represented by the input digital signal Sa. The indication of the absolute value is in a 2's complement system. The output signal Sd from the adder 37A is fed to the multiplier 22 of FIG. 4 as an absolute-value indicating signal.

Under the example of conditions which is shown in FIG. 11, the input digital signal Sa is "11001" along the direction from MSB to LSB. Since the highest bit (MSB) of the input digital signal Sa is "1", the value represented by the input digital signal Sa is negative. In this case, the output signal Sd from the adder 37A is "00111" along the direction from MSB to LSB which corresponds to the 2's complement of the value represented by the input digital signal Sa. The output signal Sd from the adder 37A indicates the absolute value of the value represented by the input digital signal Sa.

Operation of the second portion 21B of the absolute-value calculator 21 is similar to operation of the first portion 21A thereof. The second portion 21B of the absolute-value calculator 21 processes the input digital signal Sb into a digital signal Se which indicates the absolute value of the value represented by the input digital signal Sb. The output signal Se from the second portion 21B of the absolute-value calculator 21 is fed to the multiplier 22 of FIG. 4 as an absolute-value indicating signal.

Figure 12:
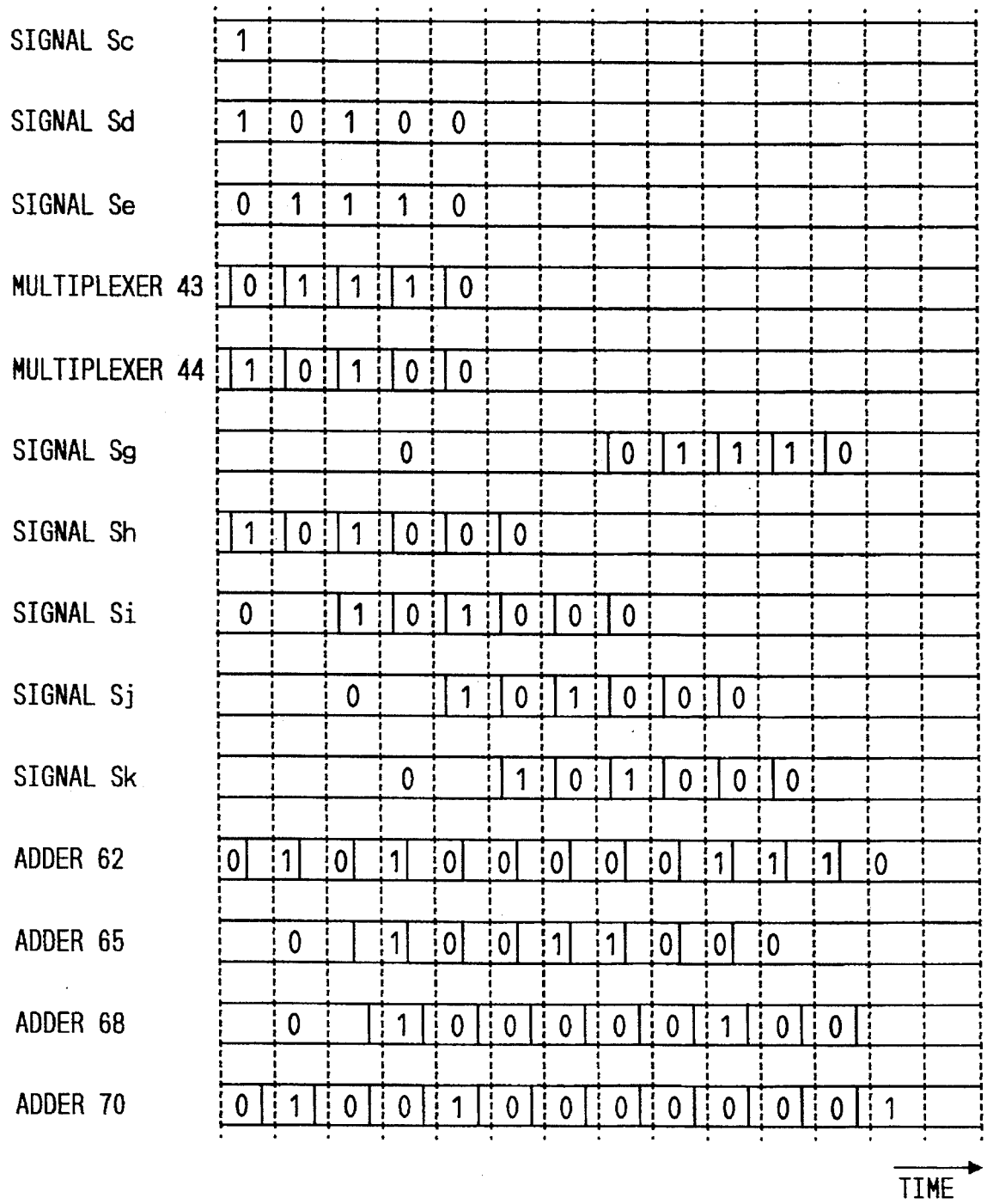
FIG. 12 is a time-domain diagram of various signals in the multiplier of FIG. 7.

Operation of the multiplier 22 of FIG. 7 will now be described with reference to FIG. 12. The output signal Sc from the absolute-value comparator 20 is applied to the multiplier 22. The lowest bit (LSB) to the highest bit (MSB) of the output signal (absolute-value signal) Sd from the absolute-value calculator 21 are sequentially applied to the multiplier 22 one by one. In addition, the lowest bit (LSB) to the highest bit (MSB) of the output signal (absolute-value signal) Se from the absolute-value calculator 21 are sequentially applied to the multiplier 22 one by one. The digital signals Sd and Se applied to the multiplier 22 are synchronous with each other. Under an example of conditions which is shown in FIG. 12, the logic state of the digital signal Sc is "1". In addition, the logic state of the digital signal (absolute-value signal) Sd periodically changes as "1→0→1→0→0" while the logic state of the digital signal (absolute-value signal) Se periodically changes as "0→1→1→1→0".

The absolute-value signals Sd and Se are fed to the multiplexers 43 and 44. The output signal Sc from the absolute-value comparator 20 is fed to the multiplexers 43 and 44. The digital signal Sc is used by the multiplexers 43 and 44 as a selection control signal. The multiplexer 43 selects one of the absolute-value signals Sd and Se in response to the selection control signal Sc, and passes the selected signal to the latch 45. When the selection control signal Sc is "0", that is, when the value represented by the absolute-value signal Sd is greater than the value represented by the absolute-value signal Se, the multiplexer 43 selects the absolute-value signal Sd and passes it to the latch 45. When the selection control signal Sc is "1", that is, when the value represented by the absolute-value signal Se is greater than the value represented by the absolute-value signal Sd, the multiplexer 43 selects the absolute-value signal Se and passes it to the latch 45. The multiplexer 44 selects one of the absolute-value signals Sd and Se in response to the selection control signal Sc, and passes the selected signal to the latch 52 and the adder 62 as a digital signal Sh. When the selection control signal Sc is "0", that is, when the value represented by the absolute-value signal Sd is greater than the value represented by the absolute-value signal Se, the multiplexer 44 selects the absolute-value signal Se and passes it to the latch 52 and the adder 62 as a digital signal Sh. When the selection control signal Sc is "1", that is, when the value represented by the absolute-value signal Se is greater than the value represented by the absolute-value signal Sd, the multiplexer 44 selects the absolute-value signal Sd and passes it to the latch 52 and the adder 62 as a digital signal Sh.

The output signal from the multiplexer 43 is delayed by the latches 45, 46, 47, 48, 49, 50, and 51, and is thereby made into the delay-resultant signal Sg. The delay time provided by the latches 45–51 corresponds to a 7-bit time so that the value represented by the delay-resultant signal Sg is equal to $2^7$ times the value represented by the output signal from the multiplexer 43. The output signal Sh from the multiplexer 44 is delayed by the latches 52, 53, 54, 55, and 56, and is thereby made into the delay-resultant signal Sk. The delay time provided by the latches 52–56 corresponds to a 5-bit time so that the value represented by the delay-resultant signal Sk is equal to $2^5$ times the value represented by the output signal Sh from the multiplexer 44. The latch 53 outputs a digital signal Si which represents a value equal to $2^2$ times the value represented by the output signal Sh from the multiplexer 44. The latch 55 outputs a digital signal Sj which represents a value equal to $2^4$ times the value represented by the output signal Sh from the multiplexer 44.

The device 62 adds the output signal Sg from the latch 51 and the output signal Sh from the multiplexer 44. The latch 63 holds a carry signal generated by the adder 62. The output signal from the adder 62 is fed to the adder 70. The device 65 adds the output signal Si from the latch 53 and the output signal Sj from the latch 55. The latch 66 holds a carry signal generated by the adder 65. The output signal from the adder 65 is fed to the adder 68. The device 68 adds the output signal from the adder 65 and the output signal Sk from the latch 56. The latch 69 holds a carry signal generated by the adder 68. The output signal from the adder 68 is fed to the adder 70. The device 70 adds the output signals from the adders 62 and 68. The latch 71 holds a carry signal generated by the adder 70. The output signal So from the adder 70 represents a final calculation result which is expressed as follows.

$$\{MAX(|A|, |B|) + MIN(|A|, |B|) \times (\sqrt{2} - 1)\} \times 2^7$$

where "|A|" denotes the value represented by the digital signal Sd, that is, the absolute value of the value represented by the input digital signal Sa, and "|B|" denotes the value represented by the digital signal Se, that is, the absolute value of the value represented by the input digital signal Sb.

In cases where the input digital signals Sa and Sb represent an in-phase component and a quadrature component of a constant-envelope analog signal respectively, the value represented by the calculation-result signal So is approximate to the value "$2^7 \times \sqrt{A^2 + B^2}$".

Under the example of conditions which is shown in FIG. 12, the absolute-value signal Sd is "00101" along the direction from MSB to LSB while the absolute-value signal Se is "01110". Thus, the absolute value represented by the signal Se is greater than the absolute value represented by the signal Sd. In this case, the calculation-result signal So is "100000001001" along the direction from MSB to LSB.

Figure 13:
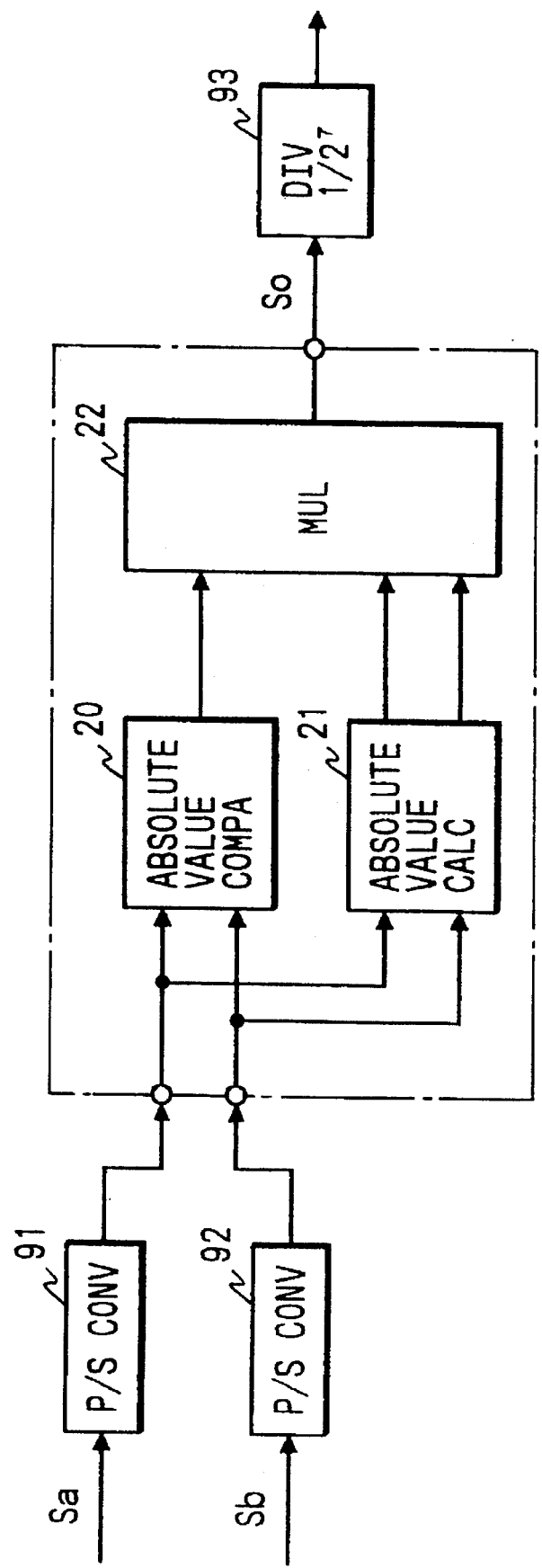
FIG. 13 is a block diagram of a calculation apparatus according to a second embodiment of this invention.

FIG. 13 shows a calculation apparatus according to a second embodiment of this invention which is similar to the embodiment of FIGS. 4–12 except for the following additional design. The calculation apparatus of FIG. 13 includes parallel-to-serial converters 91 and 92 which precede an absolute-value comparator 20 and an absolute-value calculator 21. Input digital signals Sa and Sb having a parallel form are changed by the parallel-to-serial converters 91 and 92 into corresponding digital signals having a serial form respectively. The serial-form digital signals are fed from the parallel-to-serial converters 91 and 92 to the absolute-value comparator 20 and the absolute-value calculator 21.

The calculation apparatus of FIG. 13 includes a divider 93 which follows a multiplier 22. The device 93 divides the value of the output signal So from the multiplier 22 by "$2^7$". Accordingly, the output signal from the divider 93 represents a value which is expressed as follows.

$$MAX(|A|, |B|) + MIN(|A|, |B|) \times (\sqrt{2} - 1)$$

In cases where the input digital signals Sa and Sb represent an in-phase component and a quadrature component of a constant-envelope analog signal respectively, the value represented by the output signal from the divider 93 is approximate to the value "$= \overline{A^2 + B^2}$".

What is claimed is:

1. A calculation apparatus comprising:

first means for processing a first digital signal of a serial form into a second digital signal of a serial form, the second digital signal representing an absolute value of a value represented by the first digital signal;

second means for processing a third digital signal of a serial form into a fourth digital signal of a serial form, the fourth digital signal representing an absolute value of a value represented by the third digital signal;

third means for comparing the values represented by the first and third digital signals, and generating a comparison-result digital signal representing a result of said comparing; and fourth means for generating a calculation-result digital signal of a serial form in response to the second digital signal, the fourth digital signal, and the comparison-result digital signal, the calculation-result digital signal representing a value which is approximate to a square root of a sum of a square of the value represented by the first digital signal and a square of the value represented by the third digital signal, wherein the first means comprises:

a shift register for temporarily storing the first digital signal;

a first latch for latching an MSB of the first digital signal;

an Exclusive-OR circuit for executing Exclusive-OR operation between an output signal from the shift register and an output signal from the first latch;

a second latch for latching the MSB of the first digital signal as an initial value; and a 1-bit adder for adding an output signal from the Exclusive-OR circuit and an output signal from the second latch, and generating the second digital signal;

wherein the second latch is operative for latching a carry signal generated by the adder.

2. A calculation apparatus comprising:

first means for processing a first digital signal of a serial form into a second digital signal of a serial form, the second digital signal representing an absolute value of a value represented by the first digital signal;

second means for processing a third digital signal of a serial form into a fourth digital signal of a serial form, the fourth digital signal representing an absolute value of a value represented by the third digital signal;

third means for comparing the values represented by the first and third digital signals, and generating a comparison-result digital signal representing a result of said comparing; and fourth means for generating a calculation-result digital signal of a serial form in response to the second digital signal, the fourth digital signal, and the comparison-result digital signal, the calculation-result digital signal representing a value which is approximate to a square root of a sum of a square of the value represented by the first digital signal and a square of the value represented by the third digital signal, wherein the second means comprises:

a shift register for temporarily storing the third digital signal;

a first latch for latching an MSB of the third digital signal;

an Exclusive-OR circuit for executing Exclusive-OR operation between an output signal from the shift register and an output signal from the first latch;

a second latch for latching the MSB of the third digital signal as an initial value; and a 1-bit adder for adding an output signal from the Exclusive-OR circuit and an output signal from the second latch, and generating the fourth digital signal;

wherein the second latch is operative for latching a carry signal generated by the adder.

3. A calculation apparatus comprising:

first means for processing a first digital signal of a serial form into a second digital signal of a serial form, the second digital signal representing an absolute value of a value represented by the first digital signal;

second means for processing a third digital signal of a serial form into a fourth digital signal of a serial form, the fourth digital signal representing an absolute value of a value represented by the third digital signal;

third means for comparing the values represented by the first and third digital signals, and generating a comparison-result digital signal representing a result of said comparing; and fourth means for generating a calculation-result digital signal of a serial form in response to the second digital signal, the fourth digital signal, and the comparison-result digital signal, the calculation-result digital signal representing a value which is approximate to a square root of a sum of a square of the value represented by the first digital signal and a square of the value represented by the third digital signal, wherein the third means comprises:

a first Exclusive-OR circuit for executing Exclusive-OR operation between the first digital signal and the third digital signal;

a first latch for latching an output signal from the first Exclusive-OR circuit;

an inverter for inverting the third digital signal;

a first 1-bit adder for adding the first digital signal and the second digital signal;

a second latch for latching a carry signal generated by the first adder;

a second 1-bit adder for adding the first digital signal an output signal from the inverter;

a third latch for latching a carry signal generated by the second adder;

a multiplexer for selecting one of an output signal from the first adder and an output signal from the second adder in response to an output signal from the first latch; and a second Exclusive-OR circuit for executing Exclusive-OR operation between the first digital signal and an output signal from the multiplexer, and for generating the comparison-result signal in response to the first digital signal and the output signal from the multiplexer.

4. A calculation apparatus comprising:

first means for processing a first digital signal of a serial form into a second digital signal of a serial form, the second digital signal representing an absolute value of a value represented by the first digital signal;

second means for processing a third digital signal of a serial form into a fourth digital signal of a serial form, the fourth digital signal representing an absolute value of a value represented by the third digital signal;

third means for comparing the values represented by the first and third digital signals, and generating a comparison-result digital signal representing a result of said comparing; and fourth means for generating a calculation-result digital signal of a serial form in response to the second digital signal, the fourth digital signal, and the comparison-result digital signal, the calculation-result digital signal representing a value which is approximate to a square root of a sum of a square of the value represented by the first digital signal and a square of the value represented by the third digital signal, wherein the fourth means comprises:

a first multiplexer for selecting one of the second digital signal and the fourth digital signal in response to the comparison-result signal;

a second multiplexer for selecting one of the second digital signal and the fourth digital signal in response to the comparison-result signal;

a first series combination of flip-flops successively storing an output signal from the first multiplexer;

a second series combination of flip-flops successively storing an output signal from the second multiplexer;

a first 1-bit adder for adding an output signal from the first combination of the flip-flops and the output signal from the second multiplexer;

a first latch for latching a carry signal generated by the first adder;

a second 1-bit adder for adding output signals from given flip-flops in the second combination;

a second latch for latching a carry signal generated by the second adder;

a third 1-bit adder for adding an output signal from the second combination of the flip-flops and an output signal from the second adder;

a third latch for latching a carry signal generated by the third adder;

a fourth 1-bit adder for adding an output signal from the first adder and an output signal from the third adder; and a fourth latch for latching a carry signal generated by the fourth adder.

* * * * *